Feb. 18, 1969     D. J. TUTINO     3,427,834
KEY HOLDER AND EJECTOR
Filed Aug. 9, 1967
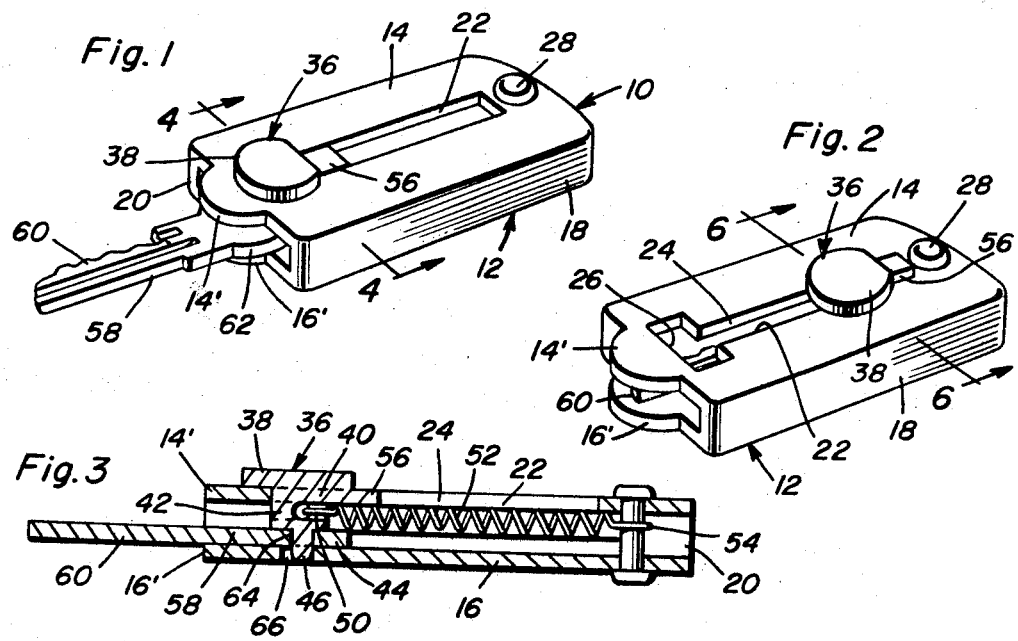
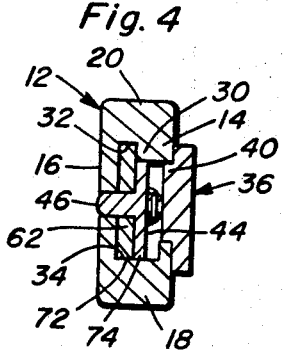 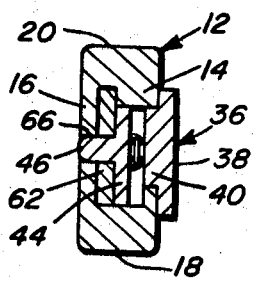 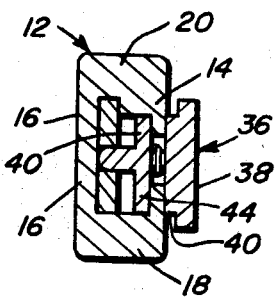
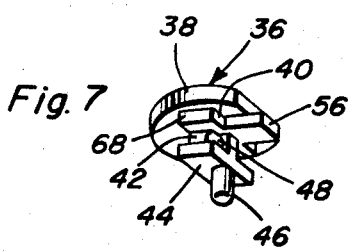
Dominick J. Tutino
INVENTOR.

United States Patent Office 3,427,834
Patented Feb. 18, 1969

3,427,834
KEY HOLDER AND EJECTOR
Dominick J. Tutino, 26 Kaywin Ave.,
Hawthorne, N.J. 07500
Filed Aug. 9, 1967, Ser. No. 659,396
U.S. Cl. 70—414
Int. Cl. E05b *19/00;* A44b *15/00;* A45c *11/32*
8 Claims

ABSTRACT OF THE DISCLOSURE

A key holder and housing into which an associated key may be retracted and from which the key may be extended, the housing including means operative to yieldingly urge the associated key toward a retracted position, means shiftable to an active position upon extension of the key to releasably retain the key in an extended position and means responsive to the application of a torsional force to the housing so as to rotate the latter about the longitudinal axis of the associated key independently of the key in one direction for shifting the key retaining means to the inactive position.

---

The key holder and ejector of the instant invention is in the form of an elongated housing open at one end and through which the associated key may be extended and retracted between the fully extended and fully retracted positions. Further, the deactivatable retaining means for releasably retaining the associated key in an extended position is operable fully independently of any portion of a lock with which the key is associated and the means by which the means for retaining the key in the extended position may be deactivated operates in a manner such that a torsional force applied to the holder in order to turn the lock cylinder with which the key is associated to the locked position will result in the key retaining means being deactivated whereby as soon as the lock cylinder is turned to the locked position the means for retracting the key relative to the holder will automatically retract the key from the lock cylinder.

The key holder and ejector of the instant invention, although constructed in the form of an elongated hollow housing including one end through which the associated key may be extended and retracted, may be in the form of any suitable construction. Further, the specific structure by which the key retaining means for holding the associated key in the extended position may assume other configurations than the single embodiment illustrated and described hereinafter.

The main object of this invention is to provide a key holder and ejector which is particularly well adapted, although having other uses, for containing the ignition key of an automobile and which will be operative to support the associated ignition key in a fully retracted position when the key is not in use.

Another object of this invention is to provide a key holder and ejector including means readily accessible from the exterior of the holder and ejector by which the associated key may be extended to the operative position and releasably retained in the extended position so that the key may be properly inserted into an ignition lock cylinder.

Still another object of this invention, in accordance with the preceding objects, is to provide a key holder and ejector including means operative to automatically retract the associated key when the holder is turned in one direction but which is inoperative to automatically retract the key when the holder is turned in the other direction.

A final object to be specifically enumerated herein is to provide a key holder and ejector in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the key holder and ejector with a conventional ignition key operatively associated therewith and illustrated in the extended position;

FIGURE 2 is a view similar to FIGURE 1 but with the associated ignition key in the fully retracted position;

FIGURE 3 is a longitudinal sectional view taken substantially upon a plane passing through the center of the key holder and with the associated key in the extended position and on somewhat of an enlarged scale;

FIGURE 4 is a transverse sectional view taken substantially upon a plane indicated by the section line 4—4 of FIGURE 1;

FIGURE 5 is a view similar to FIGURE 4;

FIGURE 6 is a transverse sectional view taken substantially upon a plane indicated by the section line 6—6 of FIGURE 2; and FIGURE 7 is an enlarged perspective view of the slide member of the key holder.

Referring now more specifically to the drawings the numeral 10 generally designates the key holder and ejector of the instant invention. The holder 10 includes a housing generally referred to by the reference numeral 12 including top and bottom walls 14 and 16 and opposite side walls 18 and 20.

The top wall 14 has a T-shaped slot 22 formed therein including a longitudinal leg 24 and a traverse leg 26 at the forward end of the housing 12 into which the forward end of the longitudinal leg 24 opens. The transverse leg 26 extends to both sides of the longitudinal leg 24 and the rear end of the housing 12 has a headed fastener 28 secured through the top and bottom walls 14 and 16. The portion of the fastener 28 projecting above the outer surface of the top wall 14 defines an abutment whose purpose will be hereinafter more fully set forth.

With attention now invited more specifically to FIGURES 4–5 of the drawings it may be seen that the marginal edge portion of the top wall 14 adjacent the side wall 20 is thickened as at 30 so as to define a narrow channel 32 opening toward an opposing wider channel 34 adjacent the side wall 18 which is of a width extending the entire distance between the top and bottom walls 14 and 16.

A slide member generally referred to by the reference numeral 36 is provided and includes a generally circular disk-like head 38 disposed exteriorly of the top wall 14, a small T-shaped portion 40 disposed immediately beneath the head 38 and which is receivable in the transverse leg 26 in the adjacent end of the leg 24, a generally rectangular shank portion 42 disposed beneath the T-shaped portion 40, a transverse portion 44 disposed beneath the shank portion 42 and which the transverse portion of the T-shaped portion 40 is registered and a depending shank 46 projecting downwardly from the center of the transverse portion 44.

The slide member is readily engageable with the top wall 14 by downwardly displacing the transverse portion 44 through the transverse leg 26 of the T-shaped slot 22. The shank portion 42 includes a transverse aperture 48 and the portions of the shank portion 42 disposed rearwardly of the aperture 48 is transversely narrowed and has one hooked end portion 50 of an expansion spring 52 at least partially encircled thereabout, the hooked end portion 50 of the expansion spring 52 passing through the aperture 48. The end of the expansion spring 52 remote from the slide member 36 is hooked about the portion of the fastener 28 disposed between the top and bottom walls 14 and 16 as at 54. Thus, the slide member 36, after being engaged with the housing 12, is yieldingly urged to a rearmost position in the longitudinal leg 24 with the rearwardly projecting leg 56 of the T-shaped portion 40 abutted against the abutment defined by the portion of the fastener 28 projecting above the top wall 14.

The ignition key associated with the holder 10 is designated by the reference numeral 58 and includes the usual notched shank portion 60 for insertion into an ignition lock cylinder as well as a head portion 62 which is apertured as at 64.

Before the slide member 36 is engaged with the housing 12 in the manner previously set forth, the ignition key 58 is positioned as illustrated in FIGURE 1 of the drawings with the aperture 64 registered with a somewhat enlarged opening 66 formed in the bottom wall 16 beneath the area in which the long leg 24 of slot 22 intersects with the transverse leg 26 of the slot 22.

The slide member 36 may be inserted downwardly to pass the T-shaped portion through the transverse leg 26 in the adjacent end of the leg 24 after the key 58 has been correctly positioned and such downward movement of the slide member 36 will engage the transverse leg 68 of the T-shaped portion 40 in the transverse leg 26 of the slot 22 and simultaneously pass the shank 46 through the aperture 64 and project the lower end of the shank 46 into the opening 66. Thus, the positioning of the lower end of the shank 46 in the opening 66 and the seating of the transverse leg 68 of the T-shaped portion 40 in the transverse leg 26 will retain the slide member 36 against rearward movement relative to the housing 12, in which direction the slide member 36 is urged by means of spring 52. Thereafter, if it is desired to move the key 58 to the fully retracted position, the free end of the shank 46 may be slightly upwardly displaced by a person's finger or fingernail so as to withdraw the lower end of the shank 46 from the opening 66 and upwardly displace the transverse leg 68 of the T-shaped portion 40 from the transverse leg of the slot 22. This will of course allow the spring 52 to retract the slide member 36 rearwardly relative to the housing 12 and thus cause the key 58 to be retracted within the confines of the housing 12.

When it is desired to extend the key, the housing 12 may be cradled in the first and second fingers of the hand and the upper surface of the head 38 may be engaged by the thumb of the hand and urged forwardly while pressing slightly downwardly on the head 38 whereby the T-shaped portion 40 will drop into the transverse leg 26 as soon as the slide member 36 has been shifted to its forwardmost position. This of course will again cause the key 58 to be retained in the extended position against retraction by the expansion spring 52. Thereafter, the housing 12 may be manipulated to insert the shank portion 60 of the key 58 into an associated ignition lock cylinder and the housing 12 may then be rotated in a clockwise direction so as to turn the key and the associated lock cylinder to the on position.

When it is desired to turn off the associated ignition lock, the housing is grasped and rotated in a counterclockwise direction. After the associated key and lock cylinder are turned counterclockwise to the off position, continued turning of the housing 12 relative to the key 58, which key is then held stationary in position by the associated lock cylinder, will cause the portion 72 of the key head portion 62 to urge the adjacent segment 74 of the transverse portion 44 to the right, see FIGURE 4, and thus shift the slide member 36 to the right relative to the housing 12 resulting in the free end of the shank 46 being withdrawn from the opening 66 and the transverse leg 68 of the T-shaped portion 40 being withdrawn from the transverse leg 26 of the slot 22 thereby freeing the slide member 36 to be rearwardly shifted by means of the expansion spring 52, which rearward movement will cause the key 58 to be shifted to the fully retracted position illustrated in FIGURE 2 of the drawings. Thus, it may be seen that the key holder and ejector 10 is fully automatic to retract the key 58 from the associated ignition lock cylinder and relative to the housing 12 whenever the housing 12 is turned in a counter-clockwise direction with the shank portion 60 of the key 58 positioned in an associated ignition lock cylinder. The key 58 may also be caused to be retracted into the housing 12 by holding the latter in one hand and the key 58 in the other hand and then rotating the key 58 in the proper direction relative to the housing 12. Further, the fastener 28 may be replaced by the conventional beaded chain for carrying other keys exteriorly of the housing 12 and the forward ends of the walls 14 and 16 include semi-circular projections or bumper lips 14' and 16' for abutting engagement with the outer faces of both planar and concave front faces of associated lock cylinders.

Of course, if for any reason it is desired that the key holder and ejector 10 be operative in reverse, that is to retract the key 58 upon rotation of the housing 12 in a clockwise direction relative to the key 58, the marginal edge portion of the top wall 14 adjacent the side wall 18 may be thickened instead of the marginal edge portion of the top wall 14 adjacent the side wall 20. In this manner, the operation of the key holder and ejector 10 may be substantially reversed as far as the key retracting feature thereof is concerned.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A key holder and ejector including a support member defining a reference axis including a marginal edge portion extending transversely of said axis, a key mounted on said support member for lengthwise extension and retraction of said key along said axis and relative to said edge portion, means yieldingly urging said key toward a retracted position, retaining means shiftable transversely of said axis from an inactive position to an active position for releasably retaining said key in an extended position upon extension of said key, said key and support member being relatively oscillatable about said axis, said key and retaining means including coacting means responsive to the application of a torsional force on said support member to oscillate the latter in one direction about said axis relative to said key for shifting said retaining means to said inactive position.

2. The combination of claim 1 wherein said support member defines an elongated housing in which at least a major portion of said key is received when said key is in the retracted position, said marginal edge portion defining one end portion of said housing in which said key is mounted for oscillation between retracted and extended positions.

3. The combination of claim 1 wherein said retaining means includes a movable actuator portion oscillatable with said key between extended and retracted positions of said key and which is shiftable transversely of said axis when said key is extended to the active position for retaining said key in the extended position.

4. The combination of claim 1 wherein said retaining means includes a movable actuator portion oscillatable with said key between extended and retracted positions of said key and which is shiftable transversely of said axis when said key is extended to the active position for retaining said key in the extended position, said support member defining an elongated housing in which at least a major portion of said key is received when said key is in the retracted position, said marginal edge portion defining one end portion of said housing in which said key is mounted for oscillation between retracted and extended positions.

5. The combination of claim 4 wherein said one end of said housing includes endwise outwardly projecting generally semi-circular parallel plate-like portions adapted to abut the front face of an associated lock cylinder and between which said key is projectable and retractable.

6. The combination of claim 4 wherein said actuator portion includes a portion thereof disposed for ready finger engagement from the exterior of said housing.

7. The combination of claim 6 wherein said means yieldingly urging said key toward a retracted position comprises spring means connected at one portion thereof to the actuator portion and to the housing at another portion thereof.

8. A key holder and ejector including a support member defining a reference axis including a marginal edge portion extending transversely of said axis, a key mounted on said support member for lengthwise extension and retraction of said key along said axis and relative to said edge portion, means yieldingly urging said key toward a retracted position, retaining means shiftable transversely of said axis from an inactive position to an active position for releasably retaining said key in an extended position upon extension of said key, said key and support member being relatively oscillatable about said axis, said key and retaining means including coacting means responsive to the application of a torsional force on said support member to oscillate the latter in only one direction about said axis relative to said key for shifting said retaining means to said inactive position.

References Cited

UNITED STATES PATENTS

| 2,547,524 | 4/1951 | Gross | 70—414 X |
| 2,659,231 | 11/1953 | Glubiak | 70—414 |
| 2,699,667 | 1/1955 | Mark et al. | 70—414 |
| 2,931,208 | 4/1960 | Prim | 70—414 |

FOREIGN PATENTS

| 562,077 | 11/1957 | Belgium. |
| 1,131,456 | 2/1955 | France. |

MARVIN A. CHAMPION, *Primary Examiner.*

P. TEITELBAUM, *Assistant Examiner.*

U.S. Cl. X.R

70—456